United States Patent [19]

Shibata et al.

[11] Patent Number: 4,733,333
[45] Date of Patent: Mar. 22, 1988

[54] CORNERING LAMP SYSTEM FOR VEHICLE

[75] Inventors: Hiroki Shibata; Atsushi Toda; Keiichi Tajima; Masahiro Kusagaya, all of Shizuoka, Japan

[73] Assignee: Koito Manufacturing Co., Ltd., Tokyo, Japan

[21] Appl. No.: 913,129

[22] Filed: Sep. 29, 1986

[30] Foreign Application Priority Data

| Sep. 30, 1985 | [JP] | Japan | 60-216912 |
| Sep. 30, 1985 | [JP] | Japan | 60-216913 |
| Feb. 6, 1986 | [JP] | Japan | 61-22986 |
| Apr. 15, 1986 | [JP] | Japan | 61-85114 |

[51] Int. Cl.$^4$ .............................................. B60Q 1/06
[52] U.S. Cl. ........................................ 362/40; 362/346
[58] Field of Search ............... 362/37, 40, 43, 304, 362/305, 346, 39, 45, 49, 54, 53; 307/10 LS; 318/671, 672, 673, 467

[56] References Cited

U.S. PATENT DOCUMENTS

| 1,305,498 | 6/1919 | Schroeder | 362/304 |
| 3,023,344 | 2/1962 | Owings | 362/37 |
| 4,276,581 | 6/1981 | Orii et al. | 362/43 |

FOREIGN PATENT DOCUMENTS 57-37037 3/1982 Japan .

Primary Examiner—Samuel Scott
Assistant Examiner—Noah Kamen
Attorney, Agent, or Firm—Blakely, Sokoloff, Taylor & Zafman

[57] ABSTRACT

A cornering lamp system for a vehicle which changes direction of the headlamps in conjunction with the operation of the vehicle's steering mechanism. The headlamps are moved in discrete steps by use of a stepper motor.

The headlamps move in the direction which the vehicle is turning, and the headlamp closest to the center of rotation moves prior to the headlamp further from the center of rotation. A delay circuit causes the headlamps to move a predetermined period of time after the direction of the steering wheel is changed.

15 Claims, 24 Drawing Figures

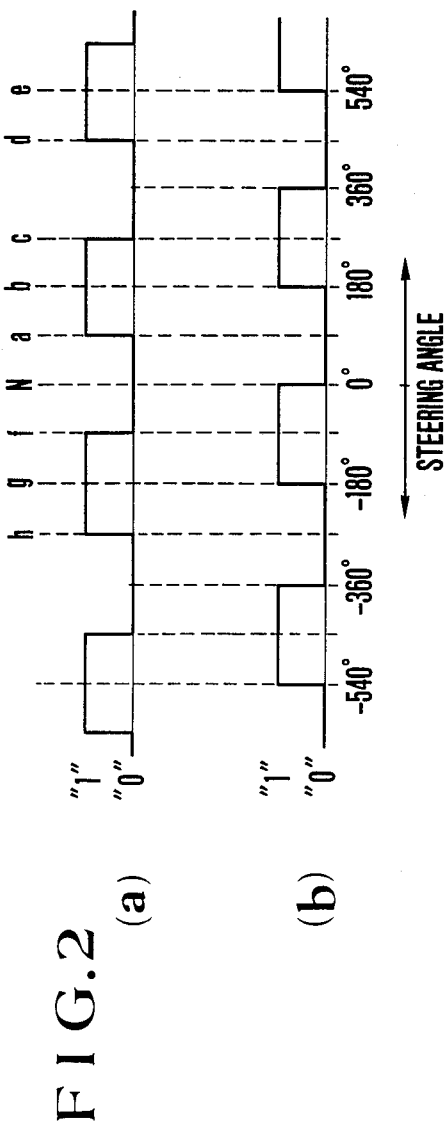
FIG. 2
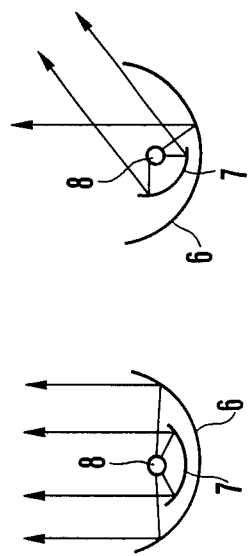
FIG. 5
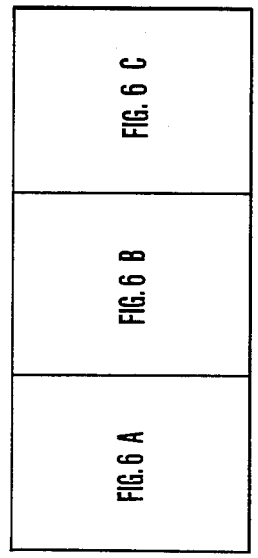
FIG. 4
FIG. 6

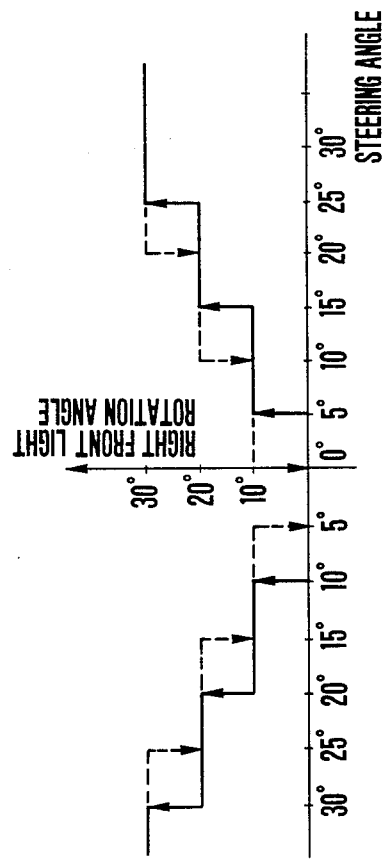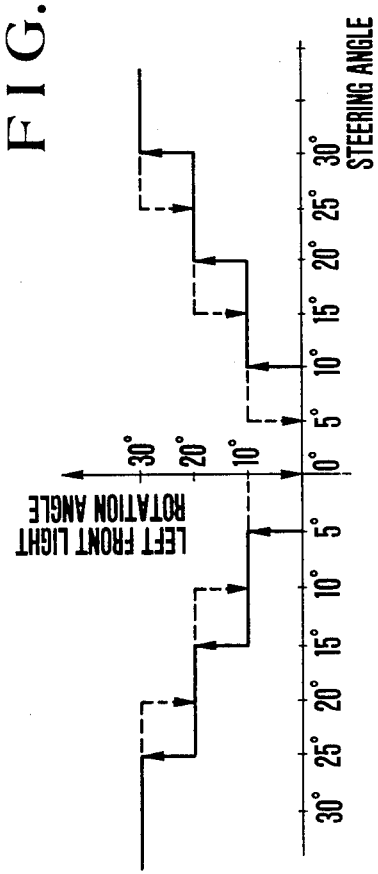

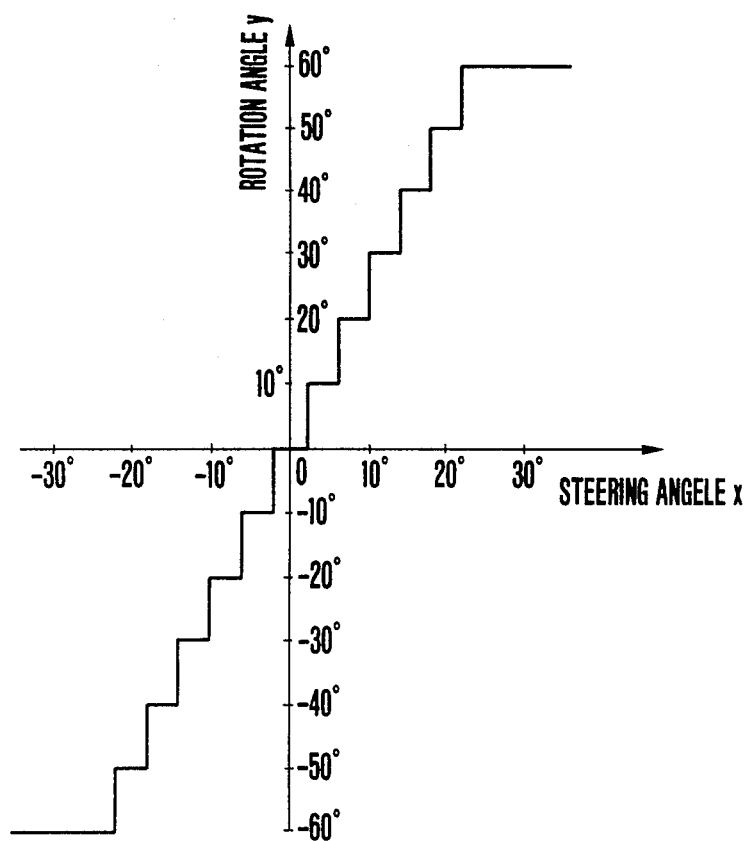
F I G.11

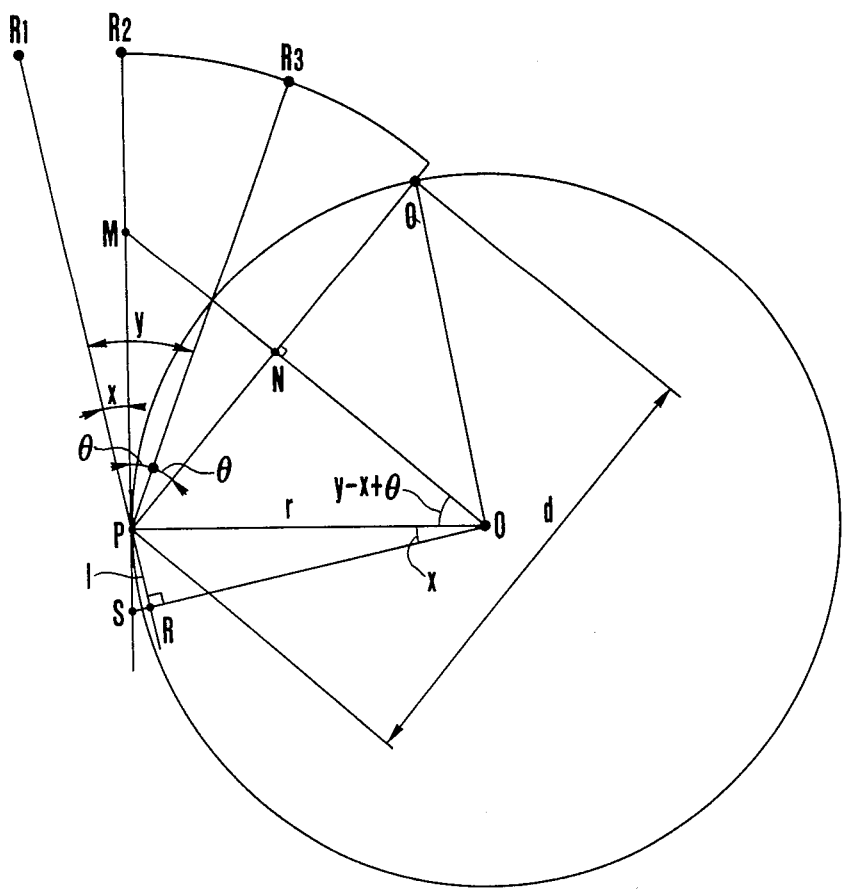
F I G.12

CORNERING LAMP SYSTEM FOR VEHICLE

BACKGROUND OF THE INVENTION

The present invention relates to a cornering lamp system for a vehicle, which is capable of changing irradiation direction of a head or front lamp in cooperation with the steering operation of a steering wheel.

Automotive vehicles are provided with a front lamp for irradiating the forward direction in the night. Conventionally, the front lamp fixedly irradiate only the front side of the autometive vehicle. When the automotive vehicle approaches a curve, it happens that the advancing direction of the automotive vehicle cannot be sufficiently irradiated. Namely, such a conventional lamp system fails to sufficiently irradiate the advancing direction along which the automotive vehicle actually moves, at the time of the cornering when turning the curve or the like, resulting in the possibility of occurence of danger.

To solve this problem, there have been proposed in the art cornering lamp systems configured so that the irradiation direction of the front lamp can be changed in cooperation with the steering operation of the steering wheel of the automotive vehicle.

For instance, a mechanical cornering lamp system to move the front lamp from the steering rod through a link, an electric cornering lamp system to detect a rotation angle of the front lamp by using a rotary encoder to control it by using a servomotor, and the like have been proposed. For the mechanical cornering lamp system, it is required to implement dedicated design specifically tailored to the kind of vehicle on which it is mounted. Accordingly, this system is not so suitable for wide use. In this respect, the electric cornering lamp system which can be widely used is more advantageous.

As stated above, the irradiation direction of the front lamp is changes in cooperation with the operation of the steering wheel of the automotive vehicle in the conventional cornering lamp systems. For this reason, the electric cornering lamp system becomes complicated in construction, giving rise to low reliability and high cost.

Moreover, since it is impossible to change the irradiation direction of the front lamp before the steering wheel is steered, pedestrians or bicycles may not be illuminate until after the car starts to turn.

In addition, the conventional cornering lamp system is configured so that the of changes of the irradiation directions of front lamps on both left and right sides are synchronized to swing the irradiation direction of the lamps by an amount proportional to the steering angle. Since a swing angle is large relative to the irradiation range of the front lamp in such a system, there is a large discrepancy between the advancing direction of the automotive vehicle and the center of the irradiation range of the front lamp, giving rise to the problem that visibility cannot be sufficiently maintained during cornering.

SUMMARY OF THE INVENTION

An object of the present invention is to eliminate the above-mentioned drawbacks with the prior arts to provide a cornering lamp system for a vehicle which has simplified structure, is manufactured at low cost, and has high reliability.

Further, another object of the present invention is to provide a cornering lamp system for a vehicle having a function to change timings of the steering operation of the steering wheel and the movement of the front lamp, and a function to make a difference between the steering angle and the center of the irradiation direction of the front lamp, thereby making it possible to provide sufficient visibility.

A cornering lamp system for a vehicle according to the present invention comprises lighting means for use in a vehicle, and means for changing the direction of a light irradiated from the lighting means stepwise in accordance with the steering operation of the steering wheel.

BRIEF DESCRIPTION OF THE DRAWINGS

FIG. 2 is a view showing waveforms for explaining the operation of the circuit shown in FIG. 1, FIGS. 6, 6a, 6b, and 6c are is a circuit diagram illustrating, in a block form, another emobodiment of a cornering lamp system according to the present invention.

FIGS. 8A and 8B are views for explaining the operation of the embodiment shown in FIG. 7, FIGS. 9A, 9B and 9C are views for explaining the operation of the embodiment shown in FIG. 7, FIGS. 10A, 10B and 10C are views for explaining the operation of the embodiment shown in FIG. 7, FIG. 11 is a view for explaining a still further emobidment according to the present invention, and FIG. 12 is a view for explaining the effect in the embodiment shown in FIG. 11.

DETAILED DESCRIPTION OF PREFERRED EMBODIMENTS

Figure 1:
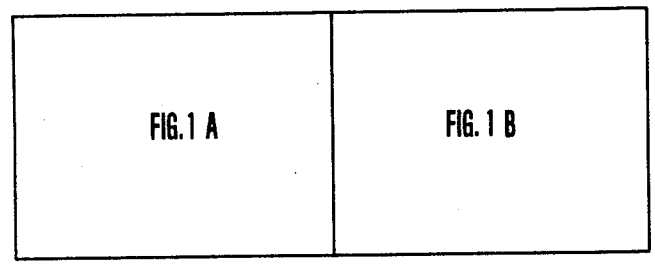
FIGS. 1, 1a and 1b are a circuit diagram illustrating, in a block form, an embodiment of a cornering lamp system according to the present invention.

A cornering lamp system for a vehicle according to the present invention will be described in detail. FIG. 1 is a circuit diagram an embodiment of the cornering lamp system. As shown in the figure, this system includes a photosensor 1 which is secured to a circular plate (not shown) with slits cooperative with the steering wheel and outputs a pulse train corresponding to a steering angle, a processing circuit 2 for processing the electric signal output from the photosensor 1, a lamp drive unit 3 responsive to a processing signal output from the processing circuit 2 to drive a front lamp (not shown), and a dc power supply 4. More particularly, the photosensor 1 is comprised of a first photointerrupter 13 comprising a light emitting diode 11, a phototransistor 12 and resistors $R_1$ and $R_2$, and a second photointerrupter 16 comprising a light emitting diode 14, a phototransistor 15 and resistors $R_3$ and $R_4$. On an output terminal 17 of the photointerrupter 13 and an output terminal 18 of the photointerrupter 16, there are produced pulse-like electric signals of which waveforms are the same, having high level ("1") and low level ("0") by turns as shown in (a) and (b) of FIG. 2, in cooperation with the steering operation of the steering wheel of the automotive vehicle. In (a) and (b) of FIG.

2, abscissa represents a steering angle. The steering angle is 0° at a neutral point N of the steering wheel. When the steering wheel is rotated clockwise with respect to the neutral point N, an electric signal indicating a positive angle is produced. In contrast, when rotated counterclockwise, an electric signal indicating a negative angle is produced. The electric signal produced on the output terminal 17 leads the electric signal produced on the output terminal 18 by a phase angle of 90°. When the steering wheel is positioned at the neutral point N, i.e, the steering angle is 0°, an electric signal having a positive angle produced on the output terminal 18 is placed in condition for just falling from "1" to "0", whereas an electric signal having a negative angle produced thereon is placed in condition for just rising from "0" to "1". At this time, an electric signal produced on the output terminal 17 represents "0".

The processing circuit 2 comprises NAND gates 21 and 22, an inverter 23, R-S flip-flop circuits 24 and 25, AND gates 26 and 27, an UP/DOWN counter 28, and a decoder/driver 29. The R-S flip-flop circuits 24 and 25 are comprised of negative logic input type OR gates 241 and 242, and 251 and 252, respectively. The output terminal 17 of the photosensor 1 is connected to one end of the NAND gates 21 and 22, and to the reset terminals 24r and 25r of the R-S flip-flop circuits 24 and 25. The output terminal 18 of the photosensor 1 is connected to one end of the AND gate 26, to the other end of the NAND gate 22, and to an input terminal of the inverter 23. An output terminal of the inverter 23 is connected to the other end of the NAND gate 21 and to the one end of the AND gate 27. Moreover output terminals of the NAND gates 21 and 22 are connected to set terminals 24s and 25s of the R-S flip-flop circuits 24 and 25, respectively, and Q output terminals 24q and 25q of the R-S flip-flop circuits 24 and 25 are connected to the other ends of the AND gates 26 and 27, respectively. Output terminals of the AND gates 26 and 27 are connected to an up input terminal 28u and a down input terminal 28d of the UP/DOWN counter 28, respectively. Every time a signal of "1" is input to the input terminal 28u or 28d, the UP/DOWN counter 28 counts up or down to output a digital signal corresponding to the count value to input terminals 29A to 29D of the decoder/driver 29 through output terminals 28A to 28D. The decoder/driver 29 receives the digital signal to select a predetermined output terminal from output terminals 29a to 29o, thus to set the level of the selected terminal to "0". Namely, the count value of the UP/DOWN counter 28 is set to zero at the neutral point N in FIG. 2. At this time, the decoder/driver 29 selects the output terminal 29h, thus to set only the level of the output terminal 29h to "0". Every time the UP/DOWN counter 28 counts up by one, the position of the output terminal which becomes "0" level is shifted ahead from 29h to 29g, 29f, ..., 29a in turn. In addition, every time the UP/DOWN counter 28 counts down by one from zero, the position of the output terminal which becomes "0" level is shifted backward from 29h to 29i, 29j ... 29o in turn. In this instance, it is needless to say that even in the case of count down after count up or of count up after count down, the position of the output terminal which becomes "0" level is shifted backward or ahead to the adjacent output terminals in turn. The output terminals 29a and 29b of the decoder/driver 29 are connected to the output terminal 2a of the processing circuit 2. Likewise, the output terminals 29c and 29d are connected to the output terminal 2b, the output terminals 29e and 29f to the output terminal 2c, the output terminals 29g, 29h and 29i to the output terminal 2d, the output terminals 29j and 29k to the output terminal 2e, the output terminals 29l and 29m to the output terminal 2f, and the output terminals 29n and 29o to the output terminal 2g.

The output terminals 2a to 2g of the processing circuit 2 are connected with wiper contacts 34b to 34h which are slidably in contact with two conductor segments 32 and 33 of a semicircular band shaped conductive patterns formed on a slide base 31 of the lamp drive unit 3. A wiper contact 34a adjacent to the wiper contact 34b is connected to the positive side of the dc power supply 4 through a coil 351 of a relay 35. A wiper contact 34i adjacent to the wiper contact 34h is connected to the positive side of the dc power supply 4 through a coil 361 of a relay 36. Diodes 37 and 38 are connected in parallel with the coils 351 and 361, respectively. To both connection terminals 39a and 39b of a dc motor 39, common terminals 352c and 362c of the relays 35 and 36 are connected, respectively. When the relay 35 is electrically energized, the common terminal 352c and the contact terminal 352a are in contact with each other, so that the positive side of the dc power supply 4 is connected to one end of the dc motor 39. On the other hand, when the relay 36 is electrically energized, the common terminal 362c and the contact terminal 362a are in contact with each other, so that the positive side of the dc power supply 4 is connected to the other end of the dc motor 39. Usually, the common terminal 352c of the relay 35 is connected to a contact terminal 352b grounded, and the common terminal 362c of the relay 36 is connected to a contact terminal 362b grounded. At this time, both ends of the dc motor 39 are grounded. When dc power is delivered to the dc motor 39 through the relay 35, the motor 39 rotates the slide base 31 clockwise through a lamp drive shaft 5 clockwise (rotation in FIG. 1). In accordance with the clockwise rotation the conductive patterns 32 and 33 also rotate clockwise as a unit with the slide base 31. In addition, when dc power is delivered to the dc motor 39 through the relay 36, the lamp drive shaft 5 rotates counterclockwise. In accordance with the counterclockwise rotation, the conductive patterns 32 and 33 rotate counterclockwise as a unit with the slide base 31. The clockwise and counterclockwise rotations of the lamp drive shaft 5 allow the irradiation direction of the front lamp to be varied. When the lamp drive shaft 5 rotates clockwise, the irradiation direction of the front lamp rotationally shifts in the right direction when viewed from an operator's seat. In contrast, when it rotates counterclockwise, the irradiation direction of the front lamp rotationally shifts in the left direction.

The operation of the cornering lamp system for a vehicle thus configured will now be described. It is assumed that an automotive vehicle advances at the straight line and the steering wheel is positioned at the neutral point (the point N in FIG. 2). At this time, the count value of the UP/DOWN counter 28 is equal to zero, and only the output terminal 29h of the decoder/driver 29 represents "0" and the remaining output terminals 29a to 29g and 29i to 29o al represent "1". Accordingly, the wiper contacts 34b to 34d and 34f to 34h which are respectively in contact with the conductive patterns 32 and 33 represent "1". Thus, power is not delivered to the relays 35 and 36, so that the dc motor 39 does not rotate. The irradiation direction of the front lamp is fixed with it being directed to the front side.

Figure 3:
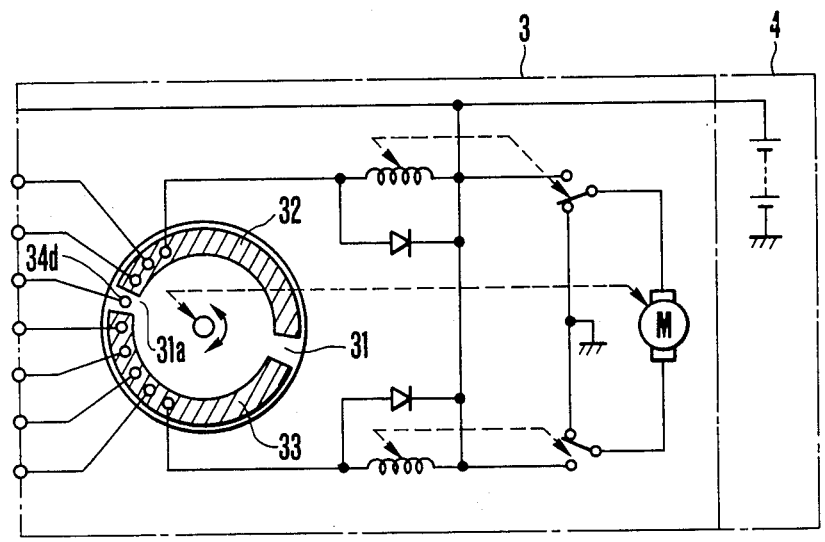
FIG. 3 is a circuit diagram for explaining the operation of the circuit shown in FIG. 1, FIGS. 4 and 5 are schematic views diagramatically illustrating the configuration of a front lamp employed in the present invention.
Figure 1A:
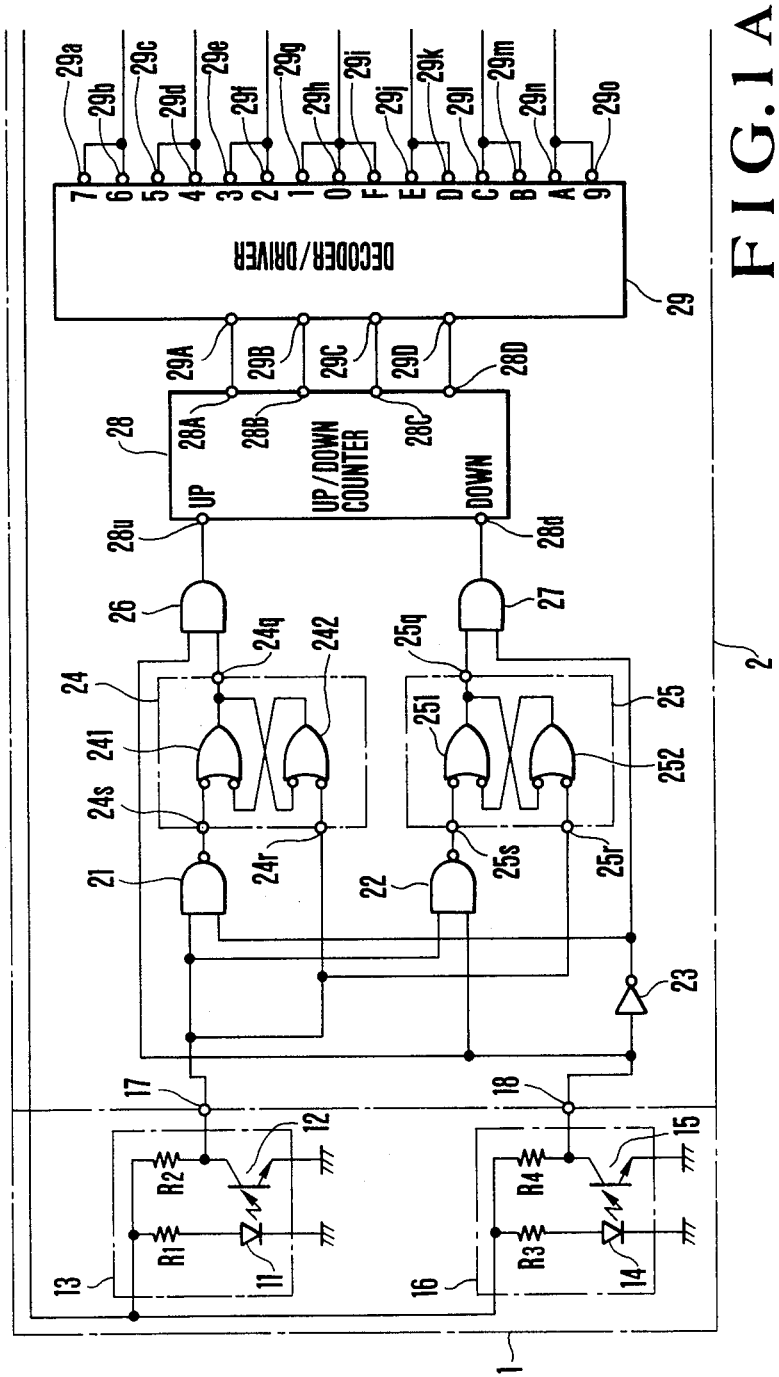
Figure 1B:
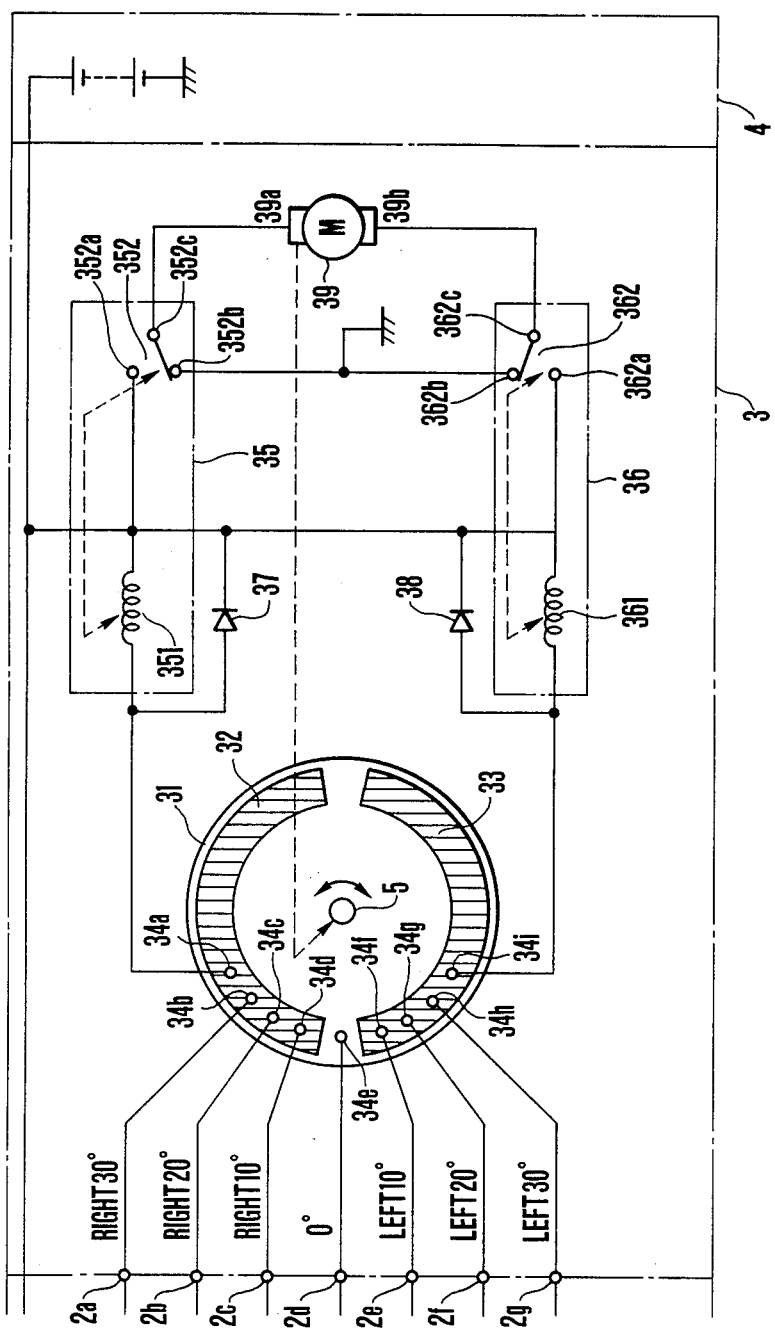

When the steering wheel is caused to rotate clockwise from such a condition to initiate the clockwise steering operation, electric signals output from the photointerrupters 13 and 16 become "1" and "0", respectively (point a in FIG. 2). Thus, the output of the NAND gate 21 shifts from "1" to "0". As a result, the R-S flip-flop circuit 24 is set, so that the Q output terminal 24q becomes "1". When the clockwise steering operation is further conducted to reach point b in FIG. 2, the output terminals 17 and 18 of the photosensor 1 both become "1" and therefore two inputs of the AND gate 26 become "1". As a result, a signal of "1" is input to the up input terminal 28u of the UP/DOWN counter 28, so that the UP/DOWN counter terminal 28 counts up by one. Thus, the decoder/driver 29 outputs the signal of "0", which has been output from the output terminal 29h, from the output terminal 29g shifted ahead. However, since the output terminal 29g is connected to the output terminal 2d of the processing circuit 2 in the same manner as the output terminal 29h, power is not delivered to the motor 39, so that the irradiation direction of the front lamp light is directed to the front and the front lamp continues to be stopped. When the clockwise steering operation further continues to be conducted, the output terminals 17 and 18 of the photosensor 1 become "0" and "1", respectively, (point c in FIG. 2). As a result, the reset terminal 24r of the R-S flip-flop circuit 24 becomes "0". Thus, this flip-flop circuit 24 is reset, resulting in "0" on the Q output terminal 24q to stand by the next count. Thus, when point d in FIG. 2 is reached, the output of the NAND gate 21 shifts from "1" to "0". As a result, the R-S flip-flop circuit 24 is set, with the result that the Q output terminal 24q becomes "1" for a second time. At the time when point e in FIG. 2 is reached, the output of the AND gate 26 becomes "1", so that the UP/DOWN counter 28 further counts up by one. By the increment of the count value, the decoder/driver 29 outputs the signal of "0", which has been output from the output terminal 29g, from the output terminal 29f shifted ahead. Thus, a current flows through the coil 351 of the relay 35 by way of the wiper contact 34a, the conductive pattern 32, the wiper contact 34d and the output terminal 2c. When the coil 351 is thus electrically energized, the common terminal 352c and the contact terminal 352a of the relay 35 are in contact with each other, so that the dc motor 39 rotates, allowing the lamp drive shaft 5 to rotate clockwise. By the clockwise rotation of the lamp drive shaft 5, the irradiation direction of the front lamp moves clockwise and the slide base 31 rotates clockwise with wiper contacts 34a to 34i sliding onto the conductive patterns 32 and 33. Thus, when the slide contact 34d is away from the conductive pattern 32, the electrical energization of the coil 351 of the relay 35 is released. As a result, the common terminal 352c and the contact terminal 352a of the relay are away from each other, so that the power supplied to the dc motor 39 is interrupted. The dc motor 39 rotates somewhat by inertia and then is stopped. FIG. 3 shows the relationship between the slide base 31 and the gaps 31a located between the conductive patterns 32 and 33. As seen from this figure, the dc motor 39 is stopped with the slide contact 34d being positioned in the central portion of the gap 31a. By continuing the clockwise steering operation in a manner stated, the UP/DOWN counter 28 counts up in succession and the position of the output terminal which outputs the signal of "0" of the decoder/driver 29 is shifted ahead in order of the output terminals 29e, 29d, ..., 29a.

Thus, the dc motor 39 intermittently rotates, so that the irradiation direction of the front lamp moves clockwise step by step.

The operation when the steering wheel is rotated conterclockwise from the neutral point will now be described. When a negative angle is taken with respect to the neutral point N in FIG. 2, both the output terminals 17 and 18 of the photosensor 1 become "1" (point f in FIG. 2), so that the output of the NAND gate 22 becomes "0". Thus, the R-S flip-flop circuit 25 is set, with the result that the Q output terminal 25q becomes "1". When the point g in FIG. 2 is reached, the output terminals 17 and 18 become "1" and "0", respectively. As a result, two inputs of the AND gate 27 both become "1". Thus, a signal of "1" is input to the down input terminal 28d of the UP/DOWN counter 28, so that the UP/DOWN counter 28 counts down by one. By this counter down operation, the decoder/driver 29 outputs the signal of "0", which has been output from the output terminal 29h from that time, from the output terminal 29i shifted backward. Then, when point h in FIG. 2 is reached, the output terminals 17 and 18 both become "0". Thus, the R-S flip-flop circuit 25 is reset, so that the Q output terminal 25q becomes "0" to stand by the next count. Thus, at the time when point i in FIG. 2 is reached, the UP/DOWN counter 28 further counts down by one. As a result, the position at which the decoder/driver 29 outputs the signal of "0" is shifted backward from the output terminal 29i to the output terminal 29j. Thus, a current flows through the coil 361 of the relay 36 by way of the wiper contact 34i, the conductive pattern 33, the wiper contact 34f, and the output terminal 2e. As a result, the common terminal 362c and the contact terminal 362a of the relay 36 are in contact with each other, so that the dc motor 39 rotates, thus allowing the lamp drive shaft 5 to rotate counterclockwise. By the counterclockwise rotation of the lamp drive shaft 5, the irradiation direction of the front lamp is shifted counterclockwise and the slide base 31 rotates counterclockwise. Thus, the wiper contact 34f is away from the conductive pattern 33, so that the electrical energization of the coil 361 of the relay 36 is released. As a result, the common terminal 362c and the contact terminal 362a of the relay 36 are away from each other, resulting in interruption of power supplied to the dc motor 39. Thus, the dc motor 39 rotates somewhat by inertia and then is stopped. By continuing the counterclockwise steering operation in the same manner as stated above, the UP/DOWN counter 28 counts down one by one, so that the position of the output termimal of the decoder/driver 29 from which the signal of "0" is output is shifted backward in order of the outputs terminals 29k, 29l, ... 29o. Thus, the dc motor 39 intermittently rotates, with the result that the irradiation direction of the front lamp is shifted counterclockwise step by step.

In the preferred embodiment, the stepwise swing angle of the irradiation direction of the front lamp is set at 10°. Accordingly, it is possible, the preferred embodiment, to swing the irradiation direction of the front lamp in the right and left directions by an angle of 30° at the maximum. To provide such a swing angle, the wiper contacts 34b to 34h are disposed at equal angular intervals and the setting is made such that this interval is sufficient to swing the irradiation direction of the front lamp by an angle of 10° at each step. It has been experimentarily confirmed that the eyesight obtained when the irradiation direction of the front lamp is varied stepwise by using such a method is sufficient. In general, the front lamp of the automotive vehicle has a lighting pattern of several ten degrees. By moving the front lamp at a step of about 10 to 30% with respect to the lighting pattern, the illumination necessary for practical use can be obtained without continuously moving the front lamp as in the prior art.

The operation of the present invention when the steering wheel is rotated clockwise and counterclockwise with respect to the neutral point has been described above. When the steering wheel is rotated counterclockwise after clockwise rotation or it is rotated clockwise after counterclockwise rotation, the UP-/DOWN counter 28 counts down or up one by one, so that the irradiation direction of the front lamp is varied in accordance with the count valuve.

As stated above, the cornering lamp system according to this emobidment can irradiate the advancing direction in cooperation with the steering operation of the steering wheel of the automotive vehicle at the time of cornering, thus ensuring safety during operation of the vehicle. Further, since the irradiation direction is varied stepwise by using the dc motor, the structure is simplified to provide a low cost and high reliability system as compared to the conventional system using a servomotor. In addition, in the case where there occurs a break at the terminal for use in detection of rotational position of the motor, or a similar failure in the conventional system using the servomotor, it happenes that it is unable to control the rotational position. In contrast, by adopting the system configuration as in this embodiment, the fail-safe operation that the operation is only stopped at the time of break can be obtained.

In the preferred embodiment, the processing circuit 2 is constituted with the hardware circuits. However, it would be apparent to one skilled in the art that a microcomputer etc. may be used to effect program control. Moreover, the wiper contacts are used to detect the rotational position of the front lamp, but the rotational position may be optically detected. Further, the stepwise swing angle of the irradiation direction of the front lamp is set at 10° and at equal intervals. Without limiting to such an implementation, an arrangement may be employed such that the intervals between respective adjacent wiper contacts 34b to 34h are vary with respect to the irradiation angle, allowing the swing angle to be set at unequal intervals.

Although the rotational movement of the irradiation direction of the front lamp by the lamp drive shaft 5 may be carried out so as to move the entirety of the front lamp, there are many instances where the necessary space cannot be ensured because the space for mounting the front lamp for an automotive vehicle is generally narrow. Further, even when there is employed an arrangement such that the entirety of the front lamp can be moved, there occurs the problem that it is unable to be moved because of freezing temperatures. For this reason, a method has been recently proposed to move a reflector within the front lamp. However, since the space for moving the reflector is required within the front lamp, the entirety of the front lamp becomes large-sized, resulting in poor realization because of limitation of space. In view of this, the front lamp of a subreflector movable type as shown in FIG. 4 is used in the cornering lamp system according to this embodiment. As seen from this figure, the front lamp comprises a main reflector 6, a subreflector 7 and a light source 8. The subreflector 7 rotates in cooperation with the lamp drive shaft 5 in FIG. 1. When the automotive vehicle advances in a straight line, the irradiation directions of rays of reflected light from the main reflector 6 and the subreflector 7 are the same. When the automotive vehicle turns the lamp drive shaft 5 intermittently rotates clockwise in cooperation with the steering operation of the steering wheel as described with reference to FIG. 1, so that only the subreflector 7 rotationally moves as shown in FIG. 5. By the rotational movement of the subreflector 7, a light reflected from the subreflector 7 is irradiated in the right direction in this figure. Namely, the reflected light from the subreflector 7 irradiates the advancing direction. At this time, the reflected light from the main reflector 6 irradiates the front side. By adopting the above-mentioned method, visibility during night operation is increased resulting in improved safety, as compared to the method of moving the entirety of the main reflector 6. Further, by employing an arrangement such that the subreflector 7 smaller than the main reflector 6 is movable, the movable space can be secured without allowing the head light to be large-sized. The realization of the method employed in this embodiment is sufficiently possible.

In the above-mentioned embodiment, there is employed an arrangement such that the front lamp is movable in cooperation with the steering operation of the steering wheel. In another embodiment of the present invention, there may be employed an arrangement such that the irradiation direction of the front lamp is fixed to the front as in the conventional manner and an auxiliary lamp is used as the moveable lighting means in cooperation with the steering operation of the steering wheel. The provision of such an auxiliary lamp can provide the same advantage as the above-mentioned subreflector 7.

Figure 6A:
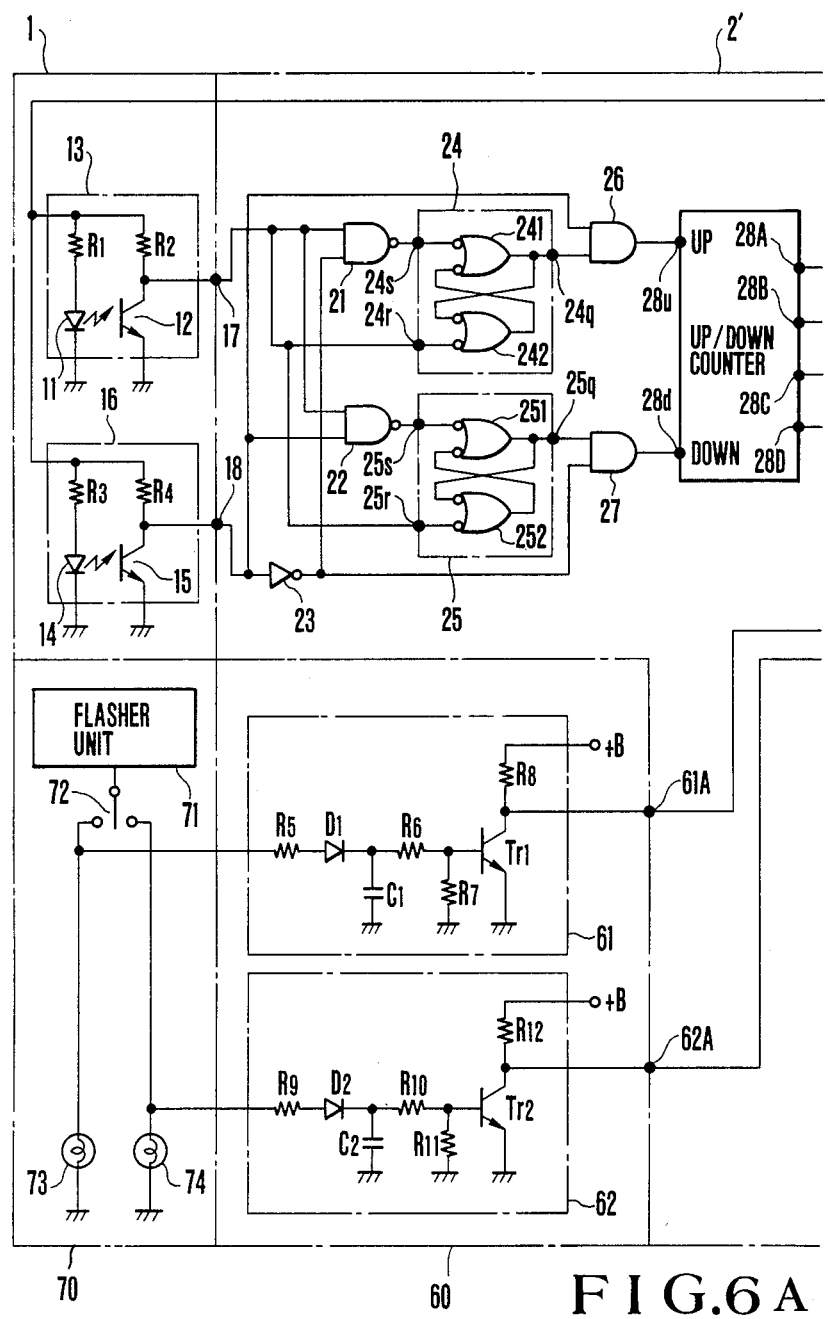
Figure 6B:
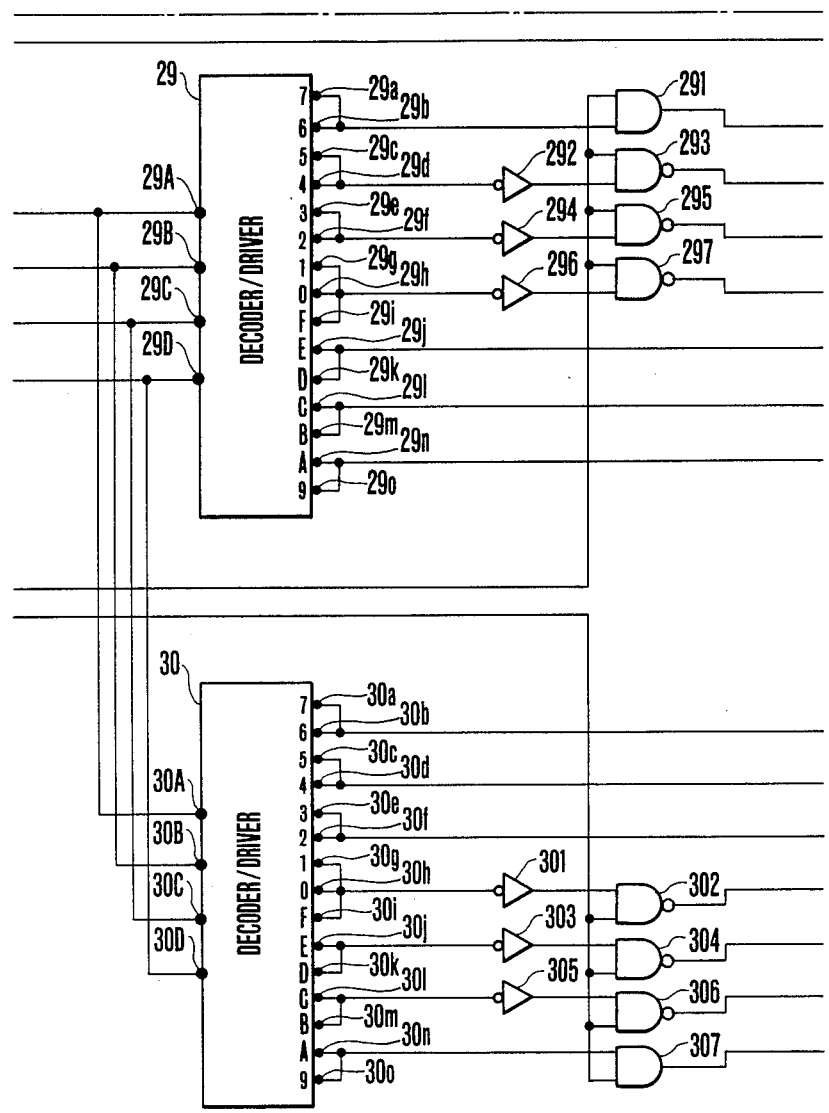
Figure 6C:
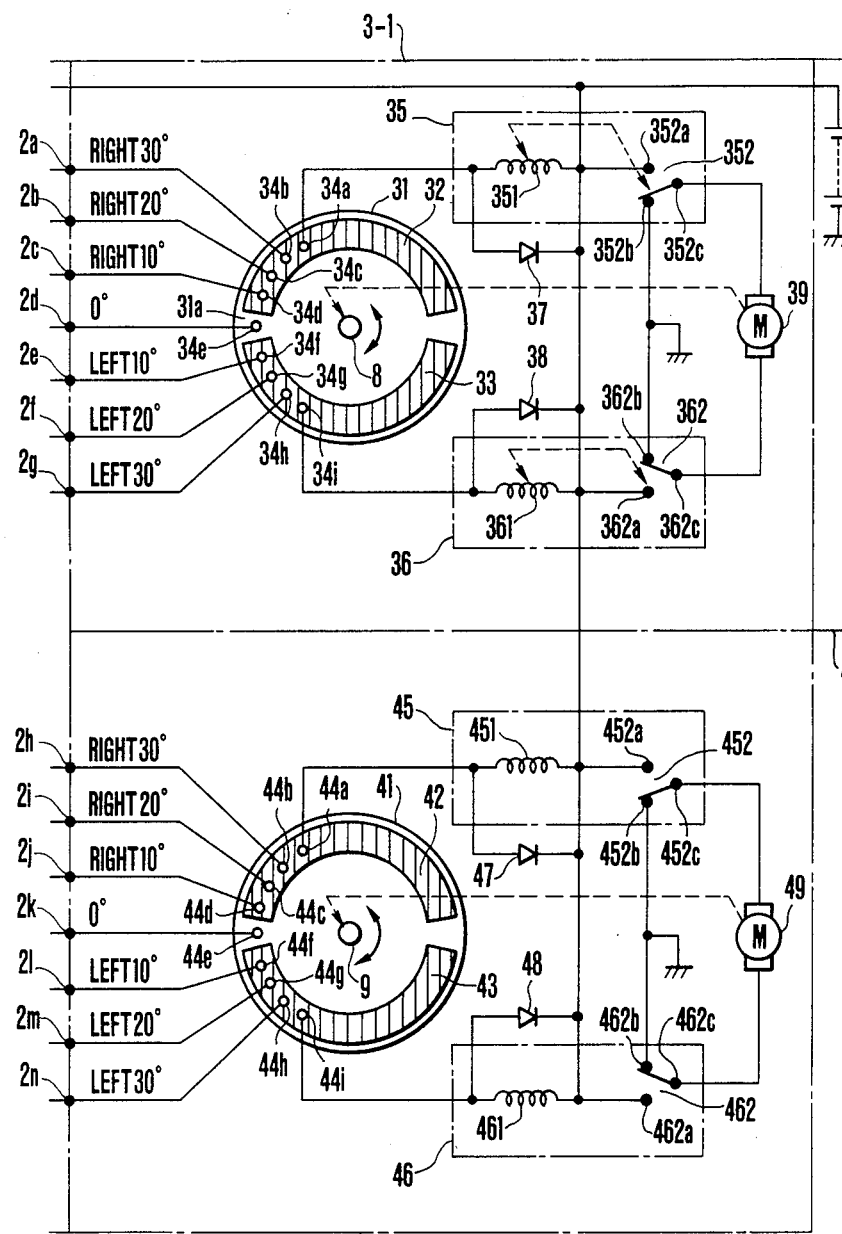

FIG. 6 is a block diagram illustrating another embodiment of a cornering lamp system according to the present invention. The cornering lamp system in this embodiment includes the photosensor 1 which is the same as that in FIG. 1, a processing circuit 2' for processing an electric signal output from the photosensor 1, a right lamp drive unit 3-1 which drives a front lamp (which will be called a "right lamp" hereinafter of which indication is omitted here) provided at the right side in front of the automotive vehicle on the basis of a processing signal output from the processing circuit 2', a left lamp drive unit 3-2 which drives a front lamp (which will be called a "left lamp" hereinafter of which indication is omitted here) provided at the left side in front of the automotive vehicle on the basis of a processing signal output from the processing circuit 2', the dc power supply 4, a turn signal generation circuitry 60, and a traffic indicator or a direction indicator 70.

More particularly, the processing circuit 2' comprises the NAND gates 21 and 22, the inverter 23, the R-S flip-flop circuits 24 and 25, the AND gates 26 and 27, the UP/DOWN counter 28, the decoder/driver 29, and a decoder/driver 30 similar to the decoder/driver 29, and they have the same construction, function and effect as those in FIG. 1. Input terminals 30A, 30B, 30C and 30D of the decoder/driver 30 are connected to input terminals 29A, 29B, 29C and 29D of the decoder/driver 29, respectively, and output terminals 30a to 30o thereof correspond to the output terminals 29a to 30o of the decoder/driver 29, respectively. These decoders/drivers 29 and 30 receive a digital signal from the UP-/DOWN counter 29 to select predetermined output terminals from the output terminals 29a to 29o and 30a to 30o, respectively, thereby allowing levels of the output terminals thus selected to be set to "0". Namely, the setting is made such that the count value of the UP/DOWN counter 28 is equal to zero at the point N in FIG. 2. At this time, the decoder/drivers 29 and 30 select the output terminals 29h and 30h, respectively, allowing only these levels of the output terminals 29h and 30h to be set to "0". Every time the UP/DOWN counter 28 counts up by one, the position of the output terminal which becomes "0" is shifted ahead from the output terminal 29h in order of the output terminals 29g, 29f, ..., 29a and from the output terminal 30h in order of the output terminals 30g, 30f, ..., 30a. In addition, every time the UP/DOWN counter 28 counts down by one from zero, the position of the output terminal which becomes "0" is shifted one by one backward from the output terminal 29h in order of the output terminals 29i, 29j, ... 29o and from the output terminal 30h in order of the output terminals 30i, 30j, ... 30o. It is needless to say that the output terminal which becomes "0" is shifted downward or ahead one by one to the adjacent output terminal even in the case of count down operation after the count up operation or count up operation after the count down operation. The output terminals 29a and 29b of the decoder/driver 29 are both connected to one input terminal of the AND gate 291. Likewise, the output terminals 29c and 29d are both connected to one input terminal of the NAND gate 293 through the inverter 292, the output terminals 29e and 29f both to one input terminal of the NAND gate 295 through the inverter 294, the output terminals 29g, 29h and 29i commonly to one input terminal of the NAND gate 297 through the inverter 296. The other input terminals of the AND gate 291 and the NAND gates 293, 295 and 297 are connected to an output terminal 61A of the turn signal generation circuitry 60. Output terminals of the AND gate 291, and the NAND gates 293, 295 and 297 serve as output terminals 2a, 2b, 2c and 2d of the processing circuit 2', respectively. The output terminals 29j and 29k, 29l and 29m, and 29n and 29o are connected to output terminals 2e, 2f, and 2g of the processing circuit 2', respectively. In addition, the output terminals 30a and 30b, 30c and 30d, and 30e and 30f of the decoder/driver 30 are connected to output terminals 2h, 2i, and 2j, respectively. Likewise, the output terminals 30g, 30h and 30i are connected to the output terminal 2k through the inverter 301 and the NAND gate 302, the output terminals 30j and 30k to the output terminal 2l through the inverter 303 and the NAND gate 304, the output terminals 30l and 30m to the output terminal 2m through the inverter 305 and the NAND gate 306, and the output terminals 30n and 30o to the output terminal 2n through the AND gate 307.

The output terminals 2a to 2g and 2h and 2n of the processing circuit 2' are respectively connected to the right and left lamp drive units 3-1 and 3-2 in the same manner as in FIG. 1.

The traffic indicator 70 is comprised of a flasher unit 71, a winker switch 72 operated at the time of turning of the automotive vehicle, and right and left direction indicating lamps 73 and 74. By operating the winker switch 72, the direction indicating lamps 73 and 74 turn on and off. The turn signal generation circuitry 60 is comprised of a turn signal generation circuit 61 comprising an NPN transistor $T_{r1}$, a capacitor $C_1$, a diode $D_1$, and resistors $R_5$ to $R_8$, and a turn signal generation circuit 62 comprising an NPN transistor $T_{r2}$, a capacitor $C_2$, a diode $D_2$, and resistors $R_9$ to $R_{12}$. A voltage produced at the junction of the winker switch 72 and the right indicating lamp 73 of the traffic indicator 70 is input to the diode $D_1$ of the turn signal generation circuit 61 through the resistor $R_5$. In addition, a voltage produced at the junction of the winker switch 72 and the left indicating lamp 74 of the traffic indicator 70 is input to the diode $D_2$ of the turn signal generation circuit 62 through the resistor $R_9$. When the winker switch 72 is operated to blink the right indicating lamp 73, a charge potential of the capacitor $C_1$ rises, so that the transistor $T_{r1}$ turns on. Thus, a signal voltage of "0" is input to the AND gate 291 and to the NAND gates 293, 295 and 297 of the processing circuit 2'. Namely, this "0" signal functions as a turn signal generated by the turn signal generation circuit 61. The turn signal ("0") is generated in the turn signal generation circuit 62 in the same manner when the left indicating lamp 74 is caused to be blinked, and is input to the AND gate 307 and the NAND gates 302, 304 and 306 of the processing circuit 2'.

The operation of the cornering lamp system for a vehicle shown in FIG. 6 will now be described. Assuming now that a vehicle driver does not operate the traffic indicator 70, the operation of the right and left lamps is the same operation as that of the lamp in the embodiment of FIG. 1. Namely, the irradiation direction is shifted synchronously stepwise in the same direction in accordance with the steering operation of the steering wheel.

However, when the steering operation of the steering wheel is carried out, the operation of the traffic indicator 70 is ordinarily conducted as well. For instance, when turning to the right on the crossing, it is legally required to blink the right indicating lamp in advance. At this time, the transistor $T_{r1}$ of the turn signal generation circuit 61 turns on in response to blinking of the right inidating lamp 73. As a result, the turn signal of "0" is input to respective one input terminals of the AND gate 291 and the NAND gates 293, 295 and 297 of the processing circuit 2'. Accordingly, irrespective of the output state of the decoder/driver 29, the output of the AND gate 291 becomes "0" and the outputs of the NAND gates 293, 295 and 297 becomes "1". As a result, a current begins flowing through the coil 351 of the right lamp drive unit 3-1 by way of the wiper contact 34a, the conductive pattern 32, the wiper contact 34b, and the output terminal 2a. Thus, the dc motor 39 is rotated to rotate the lamp drive shaft 8 clockwise. Thereby, the right lamp is rotated clockwise until the irradiation direction thereof is positioned at the maximum swing angle of 30° and then is stopped thereat. Namely, when the right indicating lamp 73 is caused to be blinked before turning to the right, the right lamp is automatically and forcedly subjected to rotational movement until the irradiation direction thereof is positioned at the maximum swing angular position on the side of the direction indication (on the side of the right direction). Thus, the right lamp fixedly irradiates the running road at which the vehicle attempts to turn. On the other hand, with respect to the left lamp, the turn signal is not generated in the turn signal generation circuit 62, the irradiation direction thereof is varied in cooperation with the steering operation of the steering wheel and rotationally moves in the right direction stepwise when turning to the right. Then, when blinking of the right indicating lamp 73 of the traffic indicator 70 is automatically released by the reverse rotation of the steering wheel after turning to the right, the generation of the turn signal in the turn signal generation circuit 61 is interrupted. As a result, the input signal to the respective input terminals of the AND gate 291 and NAND gates 293, 295 and 297 is inverted from "0" to "1". Thus, the irradiation direction of the right lamp comes off the condition where the right lamp is fixed at the maximum swing angular position and is returned in cooperation with the steering operation of the steering wheel with it being in synchronism with the irradiation direction of the left lamp.

The operation when an automotive vehicle turns to the right while blinking the right indicating lamp 73 has been described above. The operation when the automotive vehicle turns to the left while blinking the left indicating lamp 74 is the same as above. Namely, the turn signal generation circuit 62 now generates a turn signal of "0", whereby the irradiation direction of the left lamp is fixed at the maximum swing angular position on the side of its directional indication (on the side of the left direction) for the time duration of blinking of the left indicating lamp 74. Thus, this makes it possible to promptly find out an obstacle on the running road which attempts to turn before the steering operation of the steering wheel.

In the above-mentioned embodiment, the irradiation direction of the right or left lamp is fixed at the maximum swing angular position on the side of the direction indication for the time duration of blinking of the indicating lamp. However, it is not required that the irradiation direction is necessarily fixed at the maximum swing angular position. According to the designer's intention, the irradiation direction may be set at an arbitrary angular position.

Figure 7A:
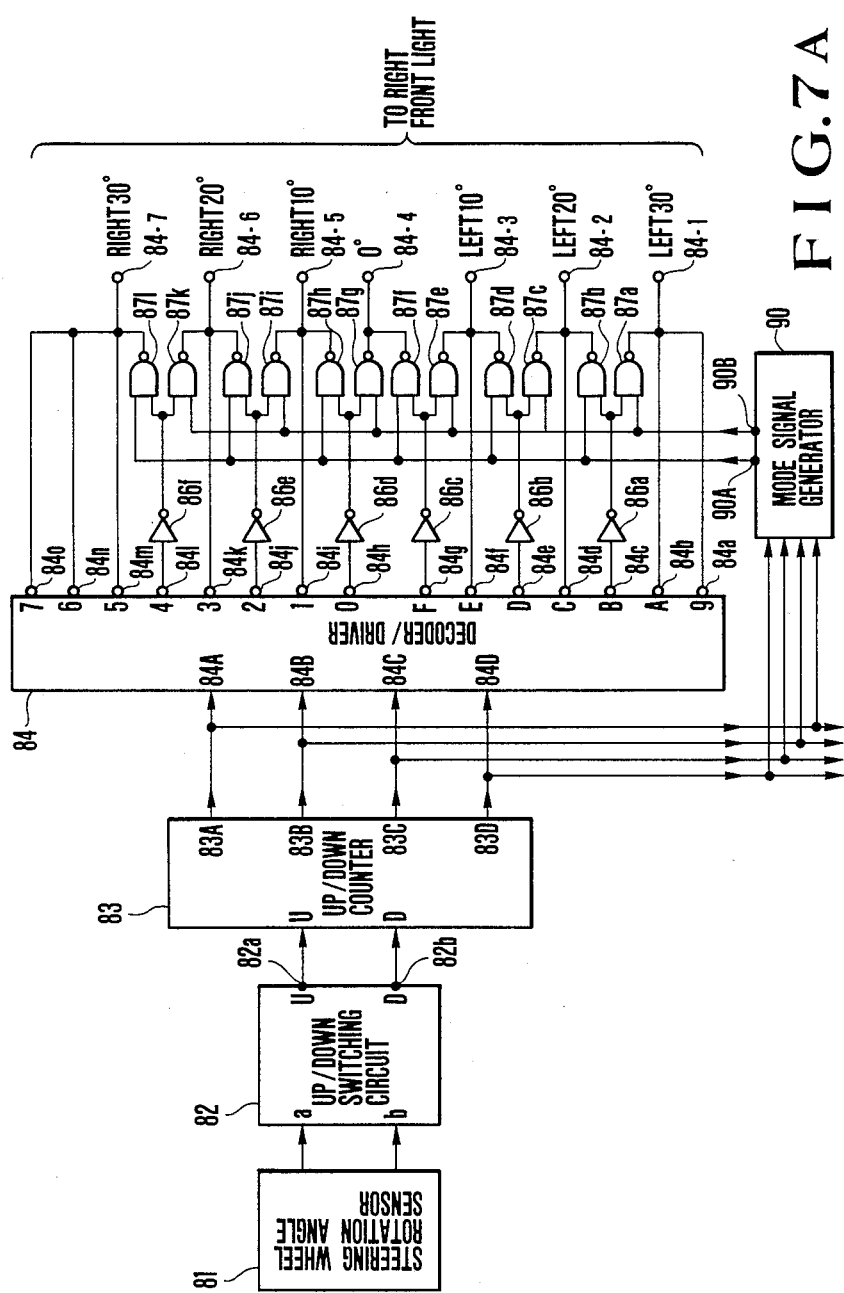
FIGS. 7, 7a, and 7b are is a block diagram illustrating a further embodiment of a cornering lamp system according to the present invention.
Figure 7B:
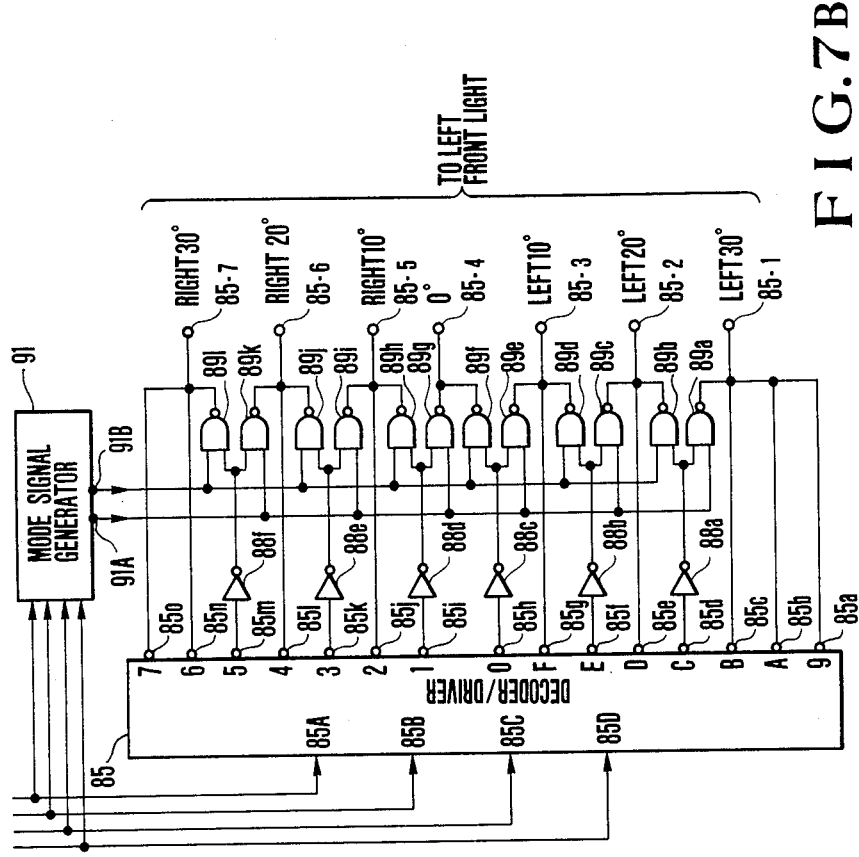
Figure 7:
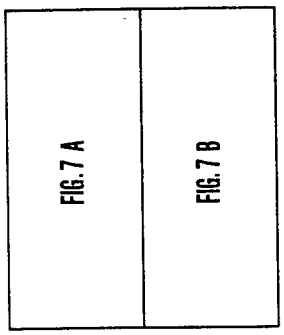

FIG. 7 is a block diagram illustrating a further embodiment of a cornering lamp system according to the present invention. The cornering lamp system in this embodiment includes a steering wheel rotation angle sensor 81 which output an electric signal comprising a pulse train having "1" and "0" pulses by turns in cooperation with the steering operation of the steering wheel, an UP/DOWN switching circuit 82 which inputs the pulse like electric signal output from the steering wheel rotation angle sensor 81 to output an up signal and a down signal proportional to the angular displacement of the steering wheel from output terminals 82a and 82b, an UP/DOWN counter 83 which inputs the up and down signal output from the UP/DOWN swictihng circuit 82 to count up or down by the number of the up signal or the down signal thus input, and decoders/drivers 84 and 85 which input a count value output from the UP/DOWN counter 83, thus allowing only the level of an output terminal at a position corresponding to the count value to be set to "0". They have the same structure and function as those described with reference to FIG. 6.

Output terminals 83A, 83B, 83C and 83D of the UP/DOWN counter 83 are connected to input terminals of mode signal generators 90 and 91. These mode signal generators 90 and 91 send outputs corresponding to a count mode of the UP/DOWN counter 83 from output terminals 90A and 90B and 91A and 91B, respectively.

Output terminals 84a and 84b, 84d, 84f, 84i, 84k, and 84m, 84n and 84o of the decoder/driver 84 are directly connected to connection terminals 84-1, 84-2, 84-3, 84-5, 84-6, and 84-7, respectively. Similarly, output terminals 85a, 85b and 85c, 85e, 85g, 85j, 85l, and 85n and 85o are connected to connection terminals 85-1, 85-2, 85-3, 85-5, 85-6, and 85-7, respectively. In addition, output terminals 84c, 84e, 84g, 84h, 84j, and 84l of the decoder/driver 84 are connected to each one input terminal of NAND gates 87a and 87b, 87c and 87d, 87e and 87f, 87g and 87h, 87i and 87j, and 87k and 87l through inverters 86a, 86b, 86c, 86d, 86e, and 86f, respectively. Output terminals of these NAND gates 87a, 87b and 87c, 87d and 87e, 87f and 87g, 87h and 87i, 87j and 87k, and 87l are connected to connection terminals 84-1, 84-2, 84-3, 84-4, 84-5, 84-6, and 84-7, respectively. Output terminals 85d, 85f, 85h, 85i, 85k, and 85m of the decoder/driver 85 are connected to each one input terminal of NAND gates 89a, 89b, 89c, 89d, 89e, 89f, 89g, 89h, 89i, 89j, 89k, and 89l through inverters 88a, 88b, 88c, 88d, 88e, and 88f, respectively. Outputs of NAND gates 89a, 89b and 89c, 89d and 89e, 89f and 89g, 89h and 89i, 89j and 89k, and 89 are connected to connection terminals 85-1, 85-2, 85-3, 85-4, 85-5, 85-6, and 85-7, respectively. On the other hand, to each of the other input terminals of the NAND gates 87b, 87d, 87f, 87h, 87j, and 87l on the side of the decoder/driver 84, one output terminal 90A of the mode signal generator 90 is commonly connected. Likewise, to each of the other input terminals of the NAND gates 87a, 87c, 87e, 87g, 87i, and 87k, the other output terminal 90B is commonly connected. Thus, a signal coresponding to the count mode of the UP/DOWN counter 83 at that time is input to the above gate circuitry. In a manner similar to the above, to the other input terminals of the NAND gates 89a, 89c, 89e, 89g, 89i, and 89k and the NAND gates 89b, 89d, 89f, 89h, 89j, and 89l which are provided on the side of the decoder/driver 85, a signal corresponding to the count mode of the UP/DOWN counter 83 at that time is input through output terminals 91A and 91B of the mode signal generator 91. Namely, when the count value of the UP/DOWN counter 83 is within a range between zero and the count value corresponding to the position of the steering angle of 5° to the left, the mode signal generator 90 outputs signals of "0" and "1" from the output terminals 90A and 90B, respectively. Outside of the above range, the mode signal generator 90 outputs signals of "0" and "1" in the up count mode, and outputs signals of "1" and "0" in the down count mode, respectively. On the other hand, when the count value of the UP/DOWN counter 83 is within a range between zero and the count value corresponding to the position of the steering angle of 5° to the right, the mode signal generator 91 outputs signals "0" and "1" from the otuput terminals 91A and 91B, respectively. Outside of this range, this generator 91 outputs signals of "1" and "0" in the up count mode from the output terminals 91A and 91B, resectively, and outputs signals of "0" and "1" in the down count mode therefrom, respectively.

When, the level of the connection terminals 84-4 on the side of the decoder/driver 84 is "0", the irradiation direction of the front lamp (not shown) on the right side when viewed from the driver's seat is directed to the direct front, and the position of the connection terminal which becomes "0" is shifted downward in order of the output terminals 84-3, 84-2 and 84-1. Thus, the irradiation direction of the right front lamp is varied stepwise in the left direction when viewed from the operator's seat in a manner that it makes an angle of 10°, 20° and 30°. In addition, the position of the connection terminal which becomes "0" is shifted ahead in order of the output terminals 84-5, 84-6 and 84-7. Thus, the irradiation direction of the right front lamp is changed stepwise in the right direction in a manner that it makes an angle of 10°, 20° and 30°. On the other hand, when the level of the connection terminal 85-4 on the side of the decoder/driver 85 is "0", the irradiation direction of the front lamp (not shown) on the left side is directed to the direct front, and the output terminal which becomes "0" is shifted downward in order of the output terminals 85-3, 85-2 and 85-1. Thus, the irradiation direction of the left front lamp is varied stepwise in the left direction when viewed from the operator's seat in a manner that it makes an angle of 10°, 20° and 30°. In addition, the position of the connection terminal which becomes "0" is shifted ahead in order of the output terminals 85-5, 85-6 and 85-7. Thus, the irradiation direction of the left front lamp is changed stepwise in the right direction in a manner that it makes an angle of 10°, 20° and 30°. It is to be noted that the irradiation ranges of the right and left front lamps in this embodiment are set to an angle of 30°, respectively.

The operation of the cornering lamp system thus configured will now be described. It is now assumed that an automotive vehicle advances in a straight line with the front lamp being lighted, and the steering wheel is located at the direct forward running steering position. At this time, the count value of the UP/DOWN counter 83 is equal zero, and only the output terminal 84h of the decoder/driver 84 and the output terminal 85h of the decoder/driver 85 are placed in "0". At this time, to the other input terminals of the NAND gates 87h and 87g on the side of the decoder/driver 84 and of the NAND gates 89e and 89f on the side of the decoder/driver 85 signals of "0" and "1" are input through the mode signal generators 90 and 91, respectively. As a result, the connection terminals 84-4 and 85-4 both become "0". Accordingly, at this time, the left and right front lamps are stopped with they being directed to the front.

Now, when the steering wheel is rotated clockwise from such a condition, thus to initiate the right steering operation, the steering wheel rotation angle sensor 81 begins outputting a pulse like electric signal. As a result, an up signal corresponding to the steering amount of the steering wheel is input to the UP/DOWN counter 83 through the UP/DOWN switching circuit 82. Thus, the UP/DOWN counter 83 begins counting up from zero one by one. Then, when the count value of the UP/DOWN counter 83 becomes equal to a value corresponding to a steering angle of 5°, the decoders/drivers 84 and 85 shift ahead each position of the output terminals from which a signal of "0" is output to output the signal from the output terminals 84i and 85i. Thus, the position of the output terminal which is at "0" level is shifted ahead from the connection terminal 84-4 to the connection terminal 84-5. Because the level of the output terminal 84-5 becomes "0", the irradiation direction of the right front lamp is shifted to the position of the swing angle of 10° to the right. On the other hand, at this time, the mode signal generator 91 begins outputting signals of "1" and "0" from the output terminals 91A and 91B, respectively. As a result, the terminals of the NAND gates 89g and 89h becomes "0" and "1", respectively. Accordingly, even when the decoder/driver 85 outputs the signal of "0" from the output terminal 85i, the output of the NAND gate 89h does not become "0", with the result that the level of the connection terminal 85-5 does not shift to "0". At this time, since the level of "0" is continued at the connection terminal 85-4, the irradiation direction of the left front lamp is fixed with it being directed to the front. When the clockwise steering operation is further conducted and the count value of the UP/DOWN counter 83 reaches a value corresponding to a steering angle of 10°, the decoder/drivers 84 and 85 shift ahead the position of the output terminal from which the signal of "0" is output it from the output terminals 84j and 85j. Thus, the position of the connection terminal which is at "0" level is shifted ahead from the connection terminal 85-4 to the connection terminal 85-5. Because the level of the connection terminal 85-5 becomes "0", the irradiation direction of the left front lamp is changed to the position of a swing angle of 10° in the right direction. At this time, the mode signal generator 90 outputs signals of "0" and "1" from the output terminals 90A and 90B. Accordingly, even when the decoder/driver 84 outputs a signal of "0" from the output terminal 84j, the output of the NAND gate 87j does not become "0", with the result that the level of the connection terminal 84-6 does not shift to "0". At this time, since the level of "0" is continued at the connection terminal 84-5, the irradiation direction of the right front lamp is maintained at the position of the swing angle of 10° in the right direction. In a manner similar to the above in the subsequent steering operation, at the time when the steering angle becomes equal to 15°, the irradiation direction of the right front lamp is changed to the position of the swing angle of 20° in the right direction, and at the time when the sterring angle becomes equal to 20°, the irradiation direction of the left front lamp is changed to the position of the swing angle of 20° in the right direction. In a manner stated above, the irradiation direction of the left front lamp is changed stepwise while following the irradiation direction of the right front lamp. In contrast, in the case where counterclockwise steering operation is conducted from the direct forward running condition, at the time when the steering angle becomes equal to 5°, the irradiation direction of the left front lamp is first changed to the position of the swing angle of 10° in the right direction. Then, at the time when the steering angle becomes equal to 10°, the irradiation direction of the right front lamp is changed to the swing angle of 10° in the left direction. In a manner stated above, the irradiation direction of the right front lamp is varied stepwise while following the irradiation direction of the left front lamp.

FIGS. 8A and 8B show the irradiation direction variable characteristic of the front lamp of which irradiation direction is changed stepwise in the manner stated above. In these figures, the abscissa represents a steering angle, and angles varying in the right and left directions shown respectively indicate clockwise and counterclockwise steering angles, with the angle of 0° being as the center. The ordinate represents a swing angular position in the right and left directions of the front lamp. FIGS. 8A and 8B show the irradiation direction variable characteristics of the right and left front lamps, respectively. As seen from these figures, the variable timing of the irradiation direction of the front lamp on the side of the steering direction is earlier than the variable timing of the irradiation direction of the front lamp opposite the steering direction by a steering angle of 5°. At the timing of one half of one time period of the variable timing of the front lamp on the side of the counter-steering direction, the irradiation direction of the front lamp is changed.

Figure 9A:
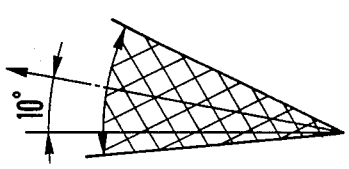
Figure 9B:
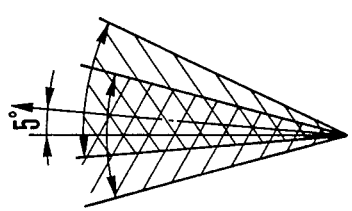
Figure 9C:
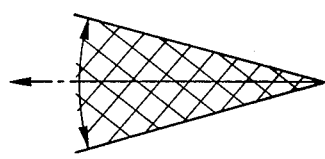

The irradiation range which the right and left lamps define is considered here. At the time when the steering angle is equal to 0°, the irradiation directions of the right and left are both directed to the front. At this time, their irradiation ranges are coincident with each other as indicated by the slanting lines in FIG. 9A, and the center (single dotted lines shown) of the irradiation range is positioned in the direct front and is in correspondence with the advancing direction. Assuming that, for example, the clockwise steering operation is initiated from such a condition, when the steering angle becomes equal to 5°, the irradiation direction of the front lamp on the side of the steering direction, is changed to the position of the swing angle of 10° to the right. At this time, sine the irradiation direction of the left front lamp is kept in the front direction, the center of the irradiation range which the right and left front lamps define is in correspondence with the advancing direction (5° to the right) at that time as shown in FIG. 9B. Further, when the steering angle becomes equal to 10°, the irradiation direction of the front lamp on the side of the counter-steering direction, is changed to the position of the swing angle of 10°. Since the irradiation direction of the right front lamp is kept at the position of the swing angle of 10° to the right, the center of the irradiation range which the right and left front lamps define is in correspondence with the advancing direction (10° to the right) at that time as shown in FIG. 9C. Namely, the center of the irradiation range which the right and left front lamps define is in correspondence with the advancing direction every time the steering angle varies by 5°. Thus, the deviation of the center of the irradiation range from the advancing direction becomes small as compared to that in the prior art, providing improved safety at the time of cornering.

Explanation has been made in the foregoing description in connection with the case where the clockwise and counterclockwise steering operations are successively conducted from the direct forward steering condition. Even in the case of the counterclockwise steering operation after the clockwise steering operation has been conducted or the clockwise steering operation after the counterclockwise operation has been conducted, the UP/DOWN counter 83 counts down or up one by one, and the decoders/drivers 84 and 85 select an output terminal located at the position corresponding to the count value to set its level to "0". It is now assumed that the steering wheel is rotated clockwise from the direct forward steering position and the decoder/driver 84 begins outputting a signal of "0" from the output terminal 84m. Accordingly, at this time, the irradiation direction of the right front lamp is positioned at the swing angle of 30° to the right. However, if the steering wheel is rotated somewhat counterclockwise, the UP/DOWN counter 83 counts down, so that the decoder/driver 84 begins outputting a signal of "0" from the output terminal 84l. On the other hand, if the steering wheel is rotated somewhat clockwise after the counterclockwise rotation, the UP/DOWN counter 83 counts up, so that the decoder/driver 84 begins outputting a signal of "0" from the output terminal 84m for a second time. The steering wheel has a play there may often happen the phenomena that such count down and up operations occur by. This is known in the art as the so called chattering phenomenon. However, according to the cornering lamp system in the present embodiment, even if such a chattering phenomenon would occur, there is no possibility that the chattering phenomenon occurs during the change of the irradiation direction of the front lamp.

It is now assumed that the UP/DOWN counter 83 counts down, so that the decoder/driver 84 begins outputting the signal of "0", which has been output from the output terminal 84m, from the output terminal 84l. At this time, signals of "1" and "0" are output from the output terminals 90A and 90B of the mode signal generator 90, respectively. As a result, the gate of the NAND gate 87l is opened and the gate of the NAND gate 87k is closed. Accordingly, even when the level of the output terminal 84l becomes "0", the position at which the signal level is "0" is not shifted from the connection terminal 84-7 to the connection terminal 84-6. Thus, the irradiation direction of the right front lamp is kept at the position of the swing angle of 30° to the right. Namely, even if there occurs the chattering phenomenon that outputs of the output terminals 84m and 84l of the decoder/driver 84 become "0" by turns. Thus, the chattering phenomenon does not occur during the change of the irradiation direction of the right front lamp and the position of the swing angle of 30° to the right is kept as it is. At the time when the UP/DOWN counter 83 further counts down and the decoder/driver 83 begins outputting a signal of "0" from the output terminal 84k, the level of the connection terminal 84-6 becomes "0", so that the irradiation direction of the right front lamp is changed to the position of the swing angle of 20° to the right. The broken lines shown in FIG. 8A represents the relationship between the steering angle, when the steering wheel is rotated counterclockwise and clockwise from the maximum clockwise and counterclockwise steering conditions and thereby is returned to the direct advancing steering position, and the position of the swing angle in the irradiation direction of the right front lamp. At the times when the clockwise steering angle becomes 20°, 10° and 0°, the swing angular position is respectively changed to 20°, 10° and 0° to the right, and at the times when the counterclockwise angle becomes 25°, 15° and 5°, the swing angular position is respectively changed to 20°, 10° and 0°.

Explanation has been made in connection with the right front lamp in the foregoing operation, however, it is needless to say that the same operation as stated above is conducted in connection with the left front lamp. Also in this case, the chattering phenomenon occuring when the irradiation direction of the left front lamp is changed can be presented. The broken lines shown in FIG. 8B represents the relationship between the steering angle, when the steering wheel is rotated counterclockwise and clockwise from the maximum clockwise and counterclockwise steering condition and is returned to the direct forward steering position, and the swing angular position of the left front lamp. At the times when the right steering angle becomes 25°, 15° and 0° to the right the swing angular position is changed to 20°, 10° and 0°, respectively. In addition, at the times when the left steering angle becomes 20°, 10° and 0°, the swing angular position is changed to 20°, 10° and 0° to the left, respectively.

Figure 10A:
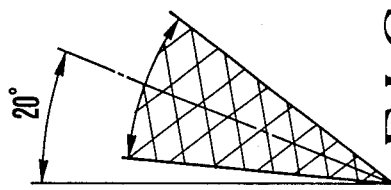
Figure 10B:
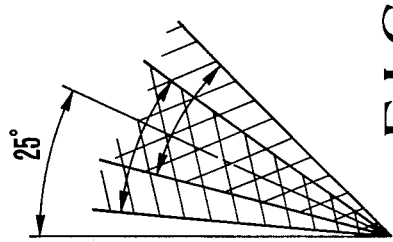
Figure 10C:
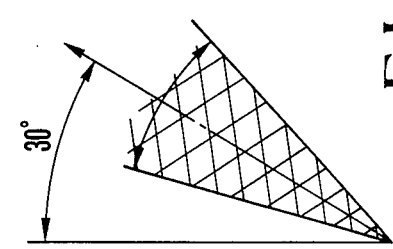

The irradiation range which the right and left front lamps define when the steering wheel is rotated counterclockwise from the steering condition of 30° to the right will be now considered. At the time when the steering angle is equal to 30°, the irradiation directions of the right and left front lamps are located at the swing angular position of 30° to the right. At this time, the irradiation ranges are coincident with each other as indicated by slanting lines in FIG. 10A, and the center (single dotted lines shown) of the irradiation range is in correspondence with advancing direction (30° to the right). Assuming that the counterclockwise steering operation is initiated from such a condition, at the time when the steering angle becomes equal to 25°, the irradiation direction of the front lamp on the side of the steering direction, i.e., the left front lamp is changed to the swing anglar position of 20° to the right. At this time, since the irradiation direction of the right front lamp is kept at the swing angular position of 30° to the right, the center of the irradiation range which the right and left front lamps define is in correspondence with the advancing direction (25° to the right) at that time as shown in FIG. 10B. Further, when the steering angle becomes equal to 20°, the irradiation direction of the front lamp on the side of the counterclockwise steering direction, i.e., the right front lamp is changed to the swing anglar position of 20° to the right. At this time, since the irradiation direction of the left front lamp is kept at the swing angular position of 20° to the right, the center of the irradiation region which the right and left front lamps define is in correspondence with the advancing direction (20° to the right) at that time as shown in FIG. 10C. During the subsequent steering operation, every time the steering angle varies by 5°, the centers of the irradiation ranges which the right and left front lamps define are coincident with each other in the manner stated above. Thus, when the steering angle becomes equal to 0°, their centers are directed to the direct front.

There is employed in this embodiment an arrangement such that the stepwise change of the irradiation direction from one side to the other has a hysteresis. Accordingly, this can eliminate the possibility that the chattering phenomenon occurs due to the play of the steering wheel when the irradiation direction of the front lamp is changed, and the possibility that the operation for allowing the center of the irradiation range which the right and left front lamps define to be in correspondence with the advancing direction fails because of the chattering phenomenon, thus providing a further improved safety at the time of running in the night.

In this embodiment, the variable timing of the irradiation direction of the front lamp on the side of the steering direction is set to the time point of one half of one time period of the variable timing of the front lamp on the side of the countersteering direction, but is not set necessarily to the time point of one half. It is to be noted that the change at the time point of one half is advantageous in that the deviation of the center of the irradiation range from the advancing direction can be as small as possible with respect to the advancing direction changing every moment. In addition, there is employed in the preferred embodiment an arrangement such that hysteresis corresponding to the steering angle of 5° is set given to the change of the stepwise irradiation direction from the It would be apparent to one skilled in the art that the hysteresis is not necessarily required to be set to the steering angle of 5°. The hysteresis can be set to an arbitrary value, although the deviation of the center of the irradiation range from the advancing direction somewhat becomes large.

FIG. 11 is a steering angle versus swing angle characteristics view showing the change of swing angle y of the irradiation direction of the front lamp with respect to steering angle x in another embodiment of the cornering lamp system which is implemented with the same configuration as that of FIG. 1. Namely, the swing angle y changes stepwise in accordance with the change of the steering angle x, and the swing angle y is set to a value substantially twice greater than the steering angle x.

FIG. 12 is a view for explaining irradiating condition of the front lamp at the time of cornering, where r represents a rotation radius at the time of cornering, 1 a wheel base, $R_1$ an irradiation direction of the front lamp, $\theta$ an irradiation range angle in the left and right directions of the front lamp with respect to the irradiation direction $R_1$, and x a steering angle at this time. Namely, a road surface irradiation distance $\alpha$ at the time of cornering is represented by line segment $\overline{PQ}$ in this figure and is expressed as follows:

$$\alpha = 2r \sin(y - x + \theta) \quad (1)$$

Assuming that the swing angle y of the front lamp is twice larger than the steering angle x, the relationship of $y = 2x$ holds. Accordingly, the equation (1) is expressed by the following equation:

$$\alpha = 2r \sin(x + \theta) \quad (2)$$

Namely, even if the rotation radius r is reduced, the $\sin(y - x + \theta)$ component increases. As a result, the decrement of the road surface irradiation distance $\alpha$ is cancelled and therefore visibility during cornering is sufficiently ensured. In addition, the road surface irradiation distance $\alpha$ at this time becomes large as compared to the conventional cornering lamp system configured so that the swing angle y of the front lamp is approximately equal to the steering angle x.

Since the configuration of such a lamp system is the same as those shown in FIGS. 1 and 6, the explanation thereof is omitted here.

What is claimed is:

1. A cornering lamp system in conjunction with a steering mechanism of a vehicle comprising:
   lighting means having a least a first and a second headlight; means for changing the direction of a irradiation beam of light transmitted from said lighting means in a stepwise manner in accordance with said steering mechanism;
   variable phase timing means for moving one of said headlights prior to moving the other headlight when said steering mechanism is operated;
   delay means for operating to provide a stepwise change of direction of said lighting means to occur out of phase with a change of direction of said steering mechanism.

2. A cornering lamp system for a vehicle as set forth in claim 1, which further comprises means for indicating the turning direction of said vheicle; and
   means for continuously fixing the direction of transmission of said lighting means at a predetermined angular position on the side of the vehicle toward the direction indicated during the time when said turning direction indication means operates.

3. A cornering lamp system as set forth in claim 1, which further comprises means for operating to provide a swing angle of the irradiation direction of said lighting means to be greater than said steering angle.

4. A cornering lamp system as set forth in claim 1, wherein said means for changing said irradiation direction stepwise comprises means for generating a signal indicative of a steering angle, processing circuit means responsive to said steering angle signal to output a signal of a first logical value from one of a plurality of output terminals and to output a signal of a logical value opposite to said first logical value from the other output terminals to shift one by one the output terminal from which said signal of said first logical value is output in accordance with an increase and a decrease of said steering angle, contacts connected to said respective output terminals of said processing circuit means, said contacts being arranged in the form of circle, a rotation circular plate having a conductor slidably contacting said contacts and arranged in the form of ring such that said conductor is divided into conductor segments by at least two gaps, and a motor of which both terminals connected to said two conductor segments having said gaps therebetween through relay circuits, respectively, whereby when power is supplied to said motor via contacts of said respective relay circuits, said motor intermittently rotates said rotation circular plate.

5. A cornering lamp system as set forth in claim 1, wherein said means for changing said irradiation direction stepwise comprises means for generating a signal indicative of a steering angle, processing circuit means responsive to said steering angle signal to output a signal of a first logical value from one of a plurality of output terminals and to output a signal of a logical value opposite to said first logical value from the other output terminals to shift one by one the output terminal from which said signal of said first logical value is output in accordance with an increase and a decrease of said steering angle, contacts connected to said respective output terminals of said processing circuit means, said contacts being arranged in the form of circle, a rotation circular plate having a conductor slidably in contact with said contacts and arranged in the form of ring in a manner that said conductor is divided into conductor segments by at least two gaps, and a motor of which both terminals connected to said two conductor segments having said gaps therebetween through relay circuits, respectively, whereby when power is supplied to said motor via contacts of said respective relay circuits, said motor intermittently rotates said rotation circular plate, said irradiation direction fixing means being provided with a logic circuit responsive to an output signal of said direction indication means to control an output signal pattern of said processing circuit means.

6. A cornering lamp system as set forth in claim 5, wherein said logic circuit is included in said processing circuit means.

7. A cornering lamp system as set forth in claim 1, wherein said means for changing said irradiation direction stepwise comprises a circuit for generating a signal which takes two voltage values by turns in accordance with said steering angle signal, counter mean for counting said signal from said circuit, decoder means for decoding an output signal from said counter means to output a signal of a first logical value from one of a predetermined number of output terminals and to output a signal of a second logical value opposite to said first logical value from the other output terminals, and means for rotating said lighting means stepwise in accordance with an output signal pattern from said decoder means, said variable timing advance means being provided with means to modify an output signal mode of said decoder means in accordance with an output signal mode of said counter means.

8. A corner lamp system for a vehicle according to claim 1 wherein said light means comprises a main reflector and a sub-reflector which is rotatable.

9. A cornering lamp system for a vehicle according to claim 2 wherein said light means comprises a main reflector and a sub-reflector which is rotatable.

10. A cornering lamp system for a vehicle according to claim 3 wherein said light means comprises a main reflector and a sub-reflector which is rotatable.

11. A cornering lamp system for a vehicle according to claim 4 wherein said light means comprises a main reflector and a sub-reflector which is rotatable.

12. A cornering lamp system for a vehicle according to claim 5 wherein said light means comprises a main reflector and a sub-reflector which is rotatable.

13. A cornering lamp system for a vehicle according to claim 6 wherein said light means comprises a main reflector and a sub-reflector which is rotatable.

14. A cornering lamp system for a vehicle according to claim 7 wherein said light means comprises a main reflector and a sub-reflector which is rotatable.

15. The system as defined in claim 1, wherein said first headlight moves in a first direction prior to said second headlight when said vehicle is turned in said first direction and wherein said second headlight moves in a second direction prior to sid first headlight when said vehicle is turned in said second direction.

* * * * *